United States Patent [19]
Pratt

[11] Patent Number: 5,957,642
[45] Date of Patent: *Sep. 28, 1999

[54] CLEAT SYSTEM

[75] Inventor: John D. Pratt, Laguna Niguel, Calif.

[73] Assignee: Textron, Inc., Providence, R.I.

[ * ] Notice: This patent is subject to a terminal disclaimer.

[21] Appl. No.: 08/972,505

[22] Filed: Nov. 18, 1997

Related U.S. Application Data

[63] Continuation of application No. 08/663,625, Jun. 14, 1996, Pat. No. 5,692,865.

[51] Int. Cl.⁶ .............. F16B 13/06; A43B 5/00
[52] U.S. Cl. .............. 411/55; 411/60; 411/354; 36/134
[58] Field of Search .............. 411/55, 57, 60, 411/354, 383, 371, 392, 401, 910; 36/134

[56] References Cited

U.S. PATENT DOCUMENTS

| | | |
|---|---|---|
| 705,571 | 7/1902 | Ferguson . |
| 2,207,476 | 7/1940 | Bernstein . |
| 2,331,555 | 10/1943 | Jostich, Jr. et al. . |
| 2,770,998 | 11/1956 | Schwartz ............... 411/910 X |
| 3,042,094 | 7/1962 | Liljeberg . |
| 3,175,455 | 3/1965 | Reddy . |
| 3,603,626 | 9/1971 | Whiteside . |
| 4,085,650 | 4/1978 | Flynn ............... 411/910 X |
| 4,445,289 | 5/1984 | Beneteau . |
| 4,474,515 | 10/1984 | Pitzer . |
| 4,623,277 | 11/1986 | Wayne et al. . |
| 4,753,559 | 6/1988 | Pentesco . |
| 4,909,523 | 3/1990 | Olson . |
| 5,028,058 | 7/1991 | Olson . |
| 5,048,848 | 9/1991 | Olson et al. . |
| 5,068,956 | 12/1991 | Malewicz . |
| 5,092,614 | 3/1992 | Malewicz . |
| 5,474,403 | 12/1995 | Hetrich . |
| 5,486,079 | 1/1996 | Martin et al. . |
| 5,692,865 | 12/1997 | Pratt ............................ 411/55 |

FOREIGN PATENT DOCUMENTS

| | | |
|---|---|---|
| 624049 | 5/1949 | United Kingdom . |
| 1428797 | 3/1976 | United Kingdom . |
| 2245326 | 1/1992 | United Kingdom . |

*Primary Examiner*—Neill Wilson
*Attorney, Agent, or Firm*—Trexler, Bushnell, Giangiorgi & Blackstone, Ltd.

[57] ABSTRACT

The present invention is a novel cleat system for efficient and reliable attachment, disengagement and reattachment to a shoe. The cleat system includes a shank and a nut. The shank includes a head on one end with a leading end on the shank opposite the head. The nut has a wall which generally defines a bore having opposed edges which define a slot at least partially extending through the wall. Displacement structure is provided on at least one of the shank and the nut which provide a mechanical advantage in translating rotary and axial forces into generally circumferential and radial forces. Threads are provided on at least one of the shank and the nut for promoting axial displacement to engage and disengage the displacement structure. Threaded engagement and disengagement of the displacement structure deform or release the wall of the nut resulting in expanding and relaxing of the nut. In the invention, the nut includes threads on an interior surface of the wall which engage threads on an external surface of the leading end of the shank. Engagement of the threads causes the displacement structure to expand the wall of the nut to engage a bore of the work piece in which the nut is inserted. In both embodiments the displacement structure and threads are configured to provide frictional engagement.

20 Claims, 5 Drawing Sheets

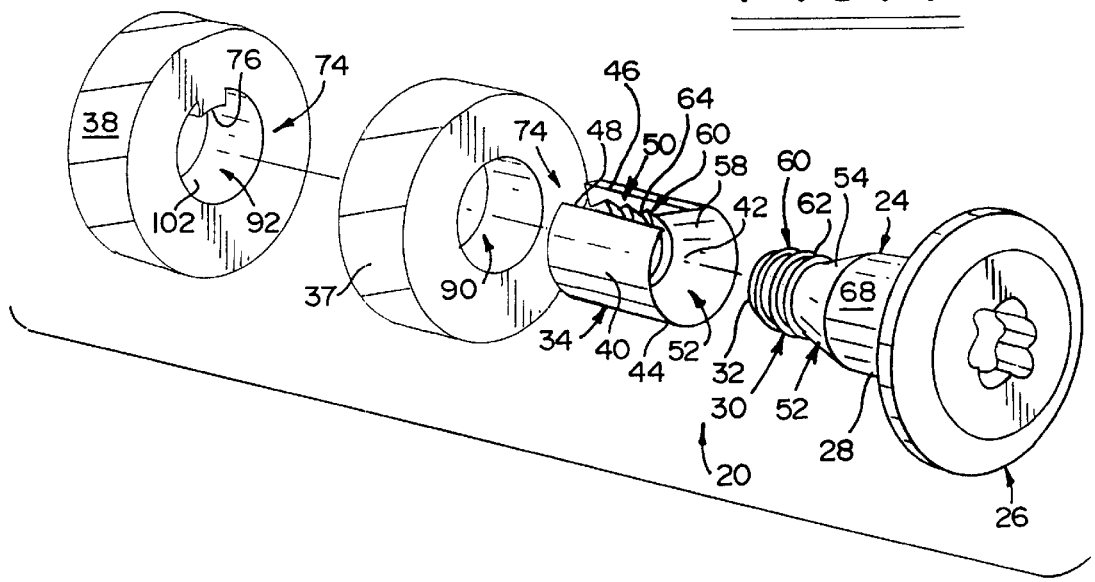
FIG. 1
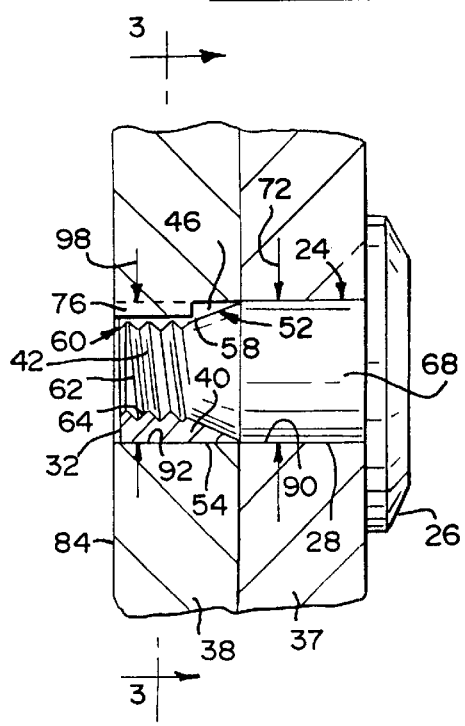
FIG. 2
FIG. 3

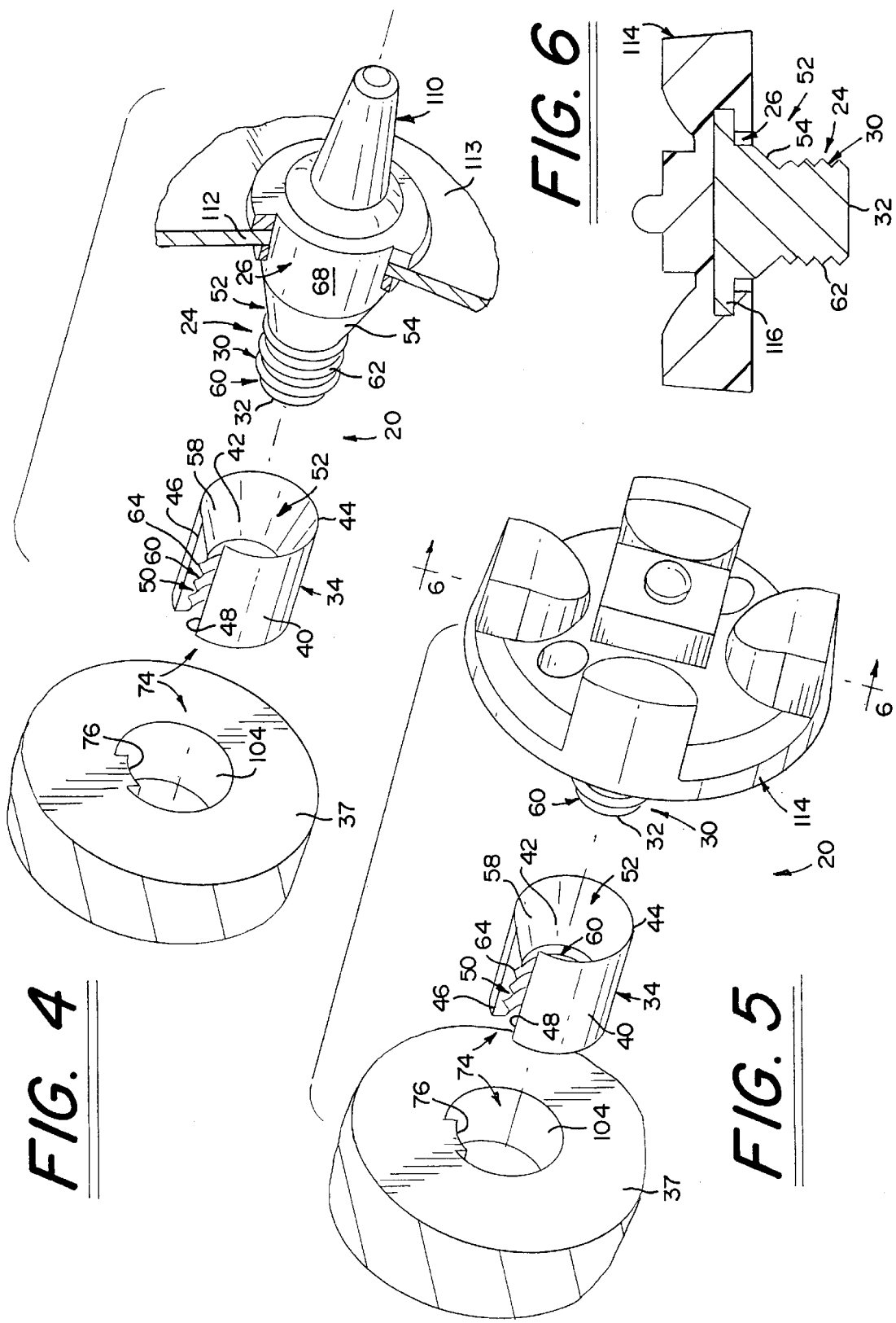

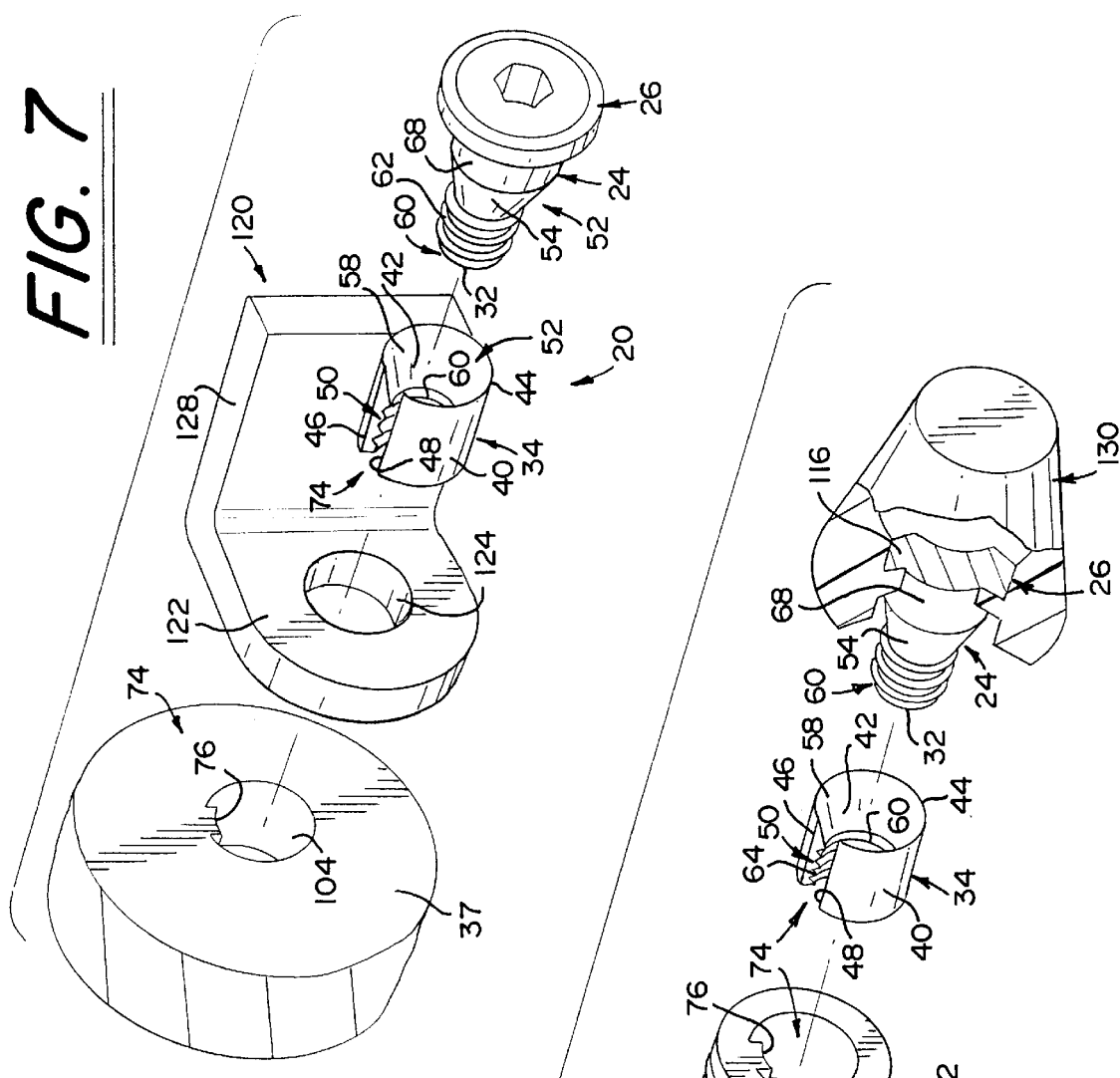

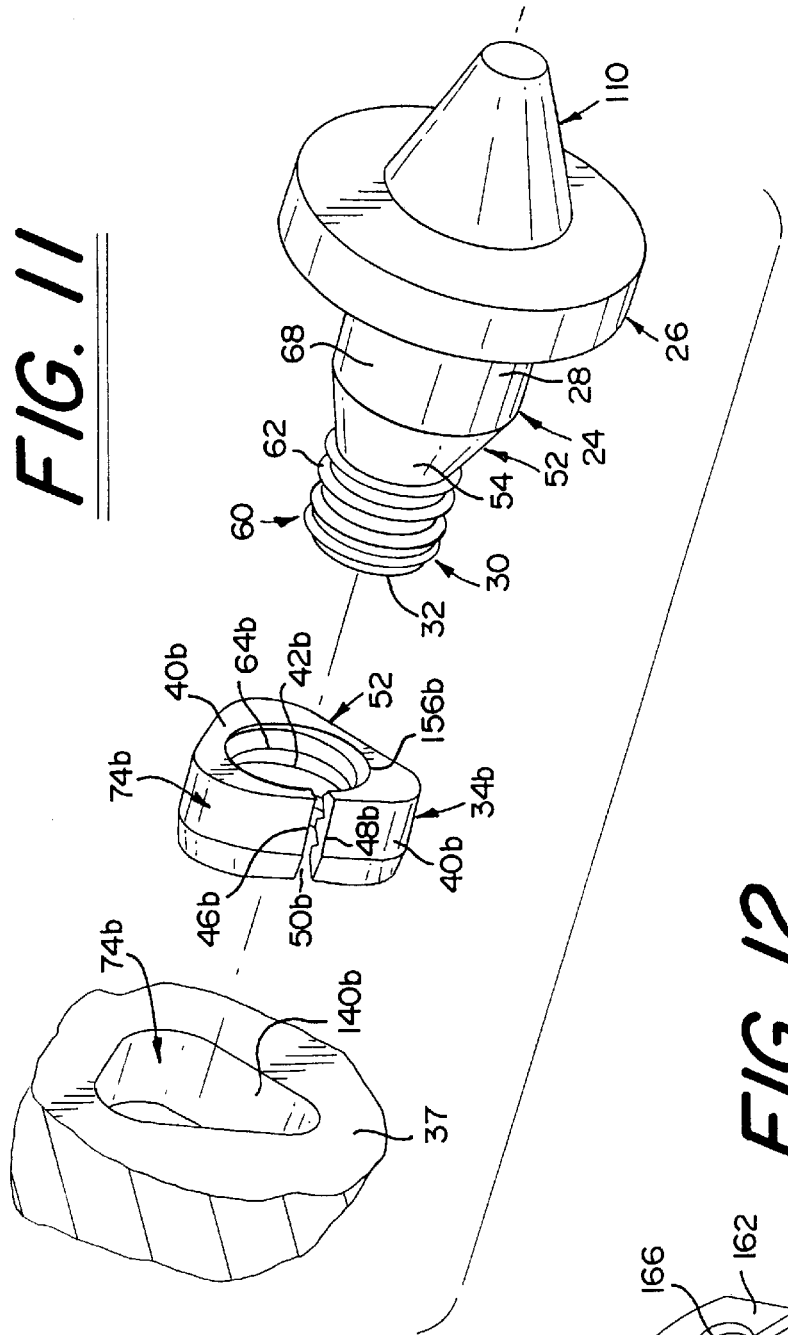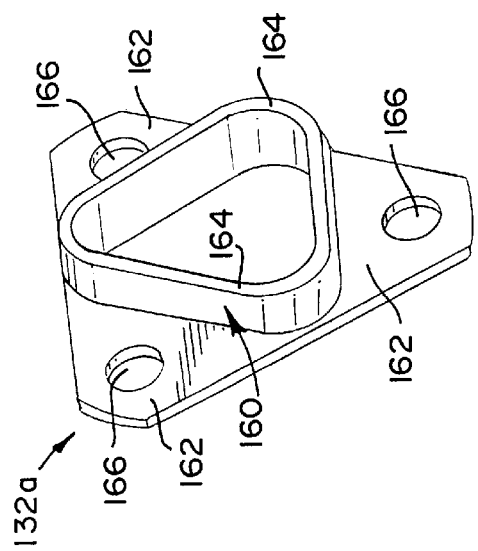

CLEAT SYSTEM

CROSS REFERENCE

The present application is a Continuation Application of U.S. patent application Ser. No. 08/663,625, filed Jun. 14, 1996, issued as U.S. Pat. No. 5,692,865 on Dec. 2,1997.

BACKGROUND

The present invention is generally directed to a novel cleat system for attaching a projection to a work piece such as a spike or "soft-spike" to a shoe.

In a variety of applications it is desirable to provide quick and reliable attachment of a cleat system to a shoe. However, prior art cleat systems, while generally providing a reliable connection, often require considerable time to attach the cleat to the shoe. For example, prior art screw-in-type cleats require numerous rotations in order to engage a threaded shank of the cleat with a shoe.

In situations where it is desirable to quickly engage or disengage a cleat, such prior art threaded cleats may not permit sufficiently quick attachment or removal. Further, such situations may also require that the cleat system be quickly and easily disengaged. As should be expected, prior art cleat systems require numerous rotations in order to disengage the threaded cleat from the corresponding shoe. As such, there is a need for a cleat system which provides quick, easy, and reliable engagement or attachment of the cleat system to a shoe as well as quick and easy removal or disengagement of the cleat from the shoe.

OBJECTS AND SUMMARY

A general object satisfied by the claimed invention is to provide a cleat system for rapid, efficient and reliable attachment to a shoe.

A general object satisfied by the claimed invention is to provide a cleat system for rapid and efficient disengagement from a shoe.

Briefly, and in accordance with the foregoing, the present invention envisions a novel cleat system for efficient and reliable attachment, disengagement and reattachment to a shoe. The cleat system includes a shank and a nut. The shank includes a head on one end with a leading end on the shank opposite the head. The nut has a wall which generally defines a bore having opposed edges which define a slot at least partially extending through the wall. Displacement structure is provided on at least one of the shank and the nut which provide a mechanical advantage in translating rotary and axial forces into generally circumferential and radial forces. Threads are provided on at least one of the shank and the nut for promoting axial displacement to engage and disengage the displacement structure. Threaded engagement and disengagement of the displacement structure deform or release the wall of the nut resulting in expanding and relaxing of the nut. In the invention, the nut includes threads on an interior surface of the wall which engage threads on an external surface of the leading end of the shank. Engagement of the threads causes the displacement structure to expand the wall of the nut to engage a bore of the work piece in which the nut is inserted. In both embodiments the displacement structure and threads are configured to provide frictional engagement.

BRIEF DESCRIPTION OF THE DRAWINGS

The organization and manner of the structure and function of the invention, together with further objects and advantages thereof, may be understood by reference to the following description taken in connection with the accompanying drawings, wherein like reference numerals identify like elements, and in which:

FIG. 1 is an enlarged, exploded perspective view of a novel cleat system of the present invention showing a shank and a nut axially aligned for engagement in a work piece such as a shoe sole;

FIG.2 is an enlarged, partial fragmentary, cross-sectional, side elevational view of the novel quick release cleat system as shown in FIG. 1 in which the shank and the nut have been assembled and engage the work piece;

FIG. 3 is a partial fragmentary, cross-sectional view taken along line 3—3 in FIG. 2;

FIG. 4 is an exploded perspective view of the novel quick release cleat system of the present invention showing a projection extending from a head of the shank;

FIG. 5 is an exploded perspective view of the novel quick release cleat system of the present invention showing an embodiment of the projection having a "soft spike" ground engaging projection attached to the head of the shank;

FIG. 6 is a cross-sectional, side-elevational view taken along line 6—6 in FIG. 5;

FIG. 7 is an exploded perspective view of the novel cleat system of the present invention showing another embodiment of the projection in the form of a tooth having a passage through which the shank and nut extend for attaching the tooth to a shoe such as a baseball shoe;

FIG. 8 is a partial fragmentary, exploded perspective view of the cleat system of the present invention including a receptacle portion attachable to the workpiece;

FIG. 11 is a perspective exploded view of the cleat system of the claimed invention in which the nut has a non-circular cross-section, more specifically shown as a triangle, to prevent rotation; and FIG. 12 is a plan view of a receptacle structure which may be used with the cleat system as shown in FIG. 11.

DESCRIPTION

Figure 9:
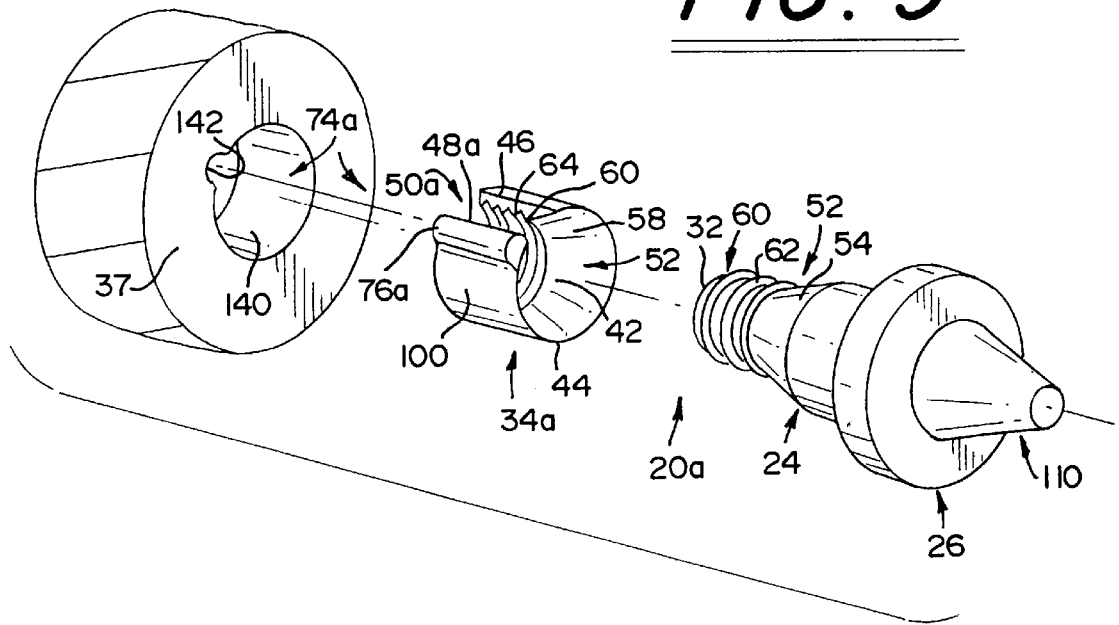
FIG. 9 is an enlarged, perspective view of the cleat system of the claimed invention in which a key is positioned on an outside surface of the nut and a channel is provided in the workpiece to prevent rotation of the nut.

While the present invention may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein.

Figure 10:
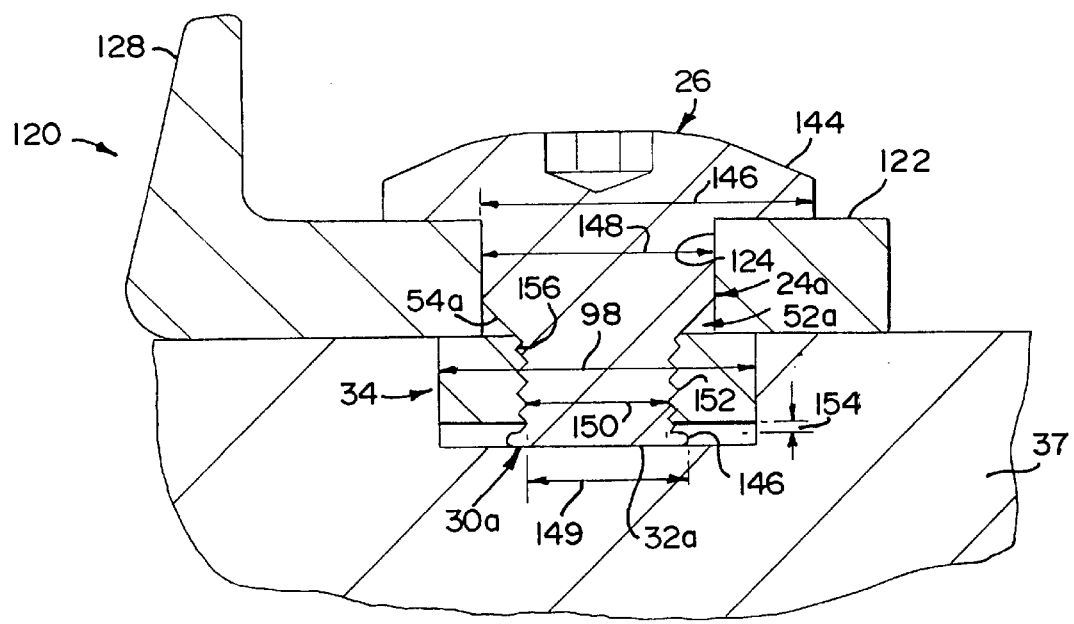
FIG. 10 is a cross-sectional, side elevational view of the cleat system of the present invention in which the shank, nut and projection are an assembly of captive hardware.

As shown in FIGS. 1–12, the present invention is a novel cleat system 20. It should be noted that while a single invention showing the cleat system 20 is illustrated in the figures, various modifications are also disclosed. For example, FIGS. 1–3 show the most basic form of the invention such that no specific ground engaging portion or projection is provided. In contrast, FIGS. 4, 9 and 11 show an embodiment which include a spike-type projection; whereas, FIGS. 5 and 6 show a "soft-spike" projection, FIGS. 7 and 10 show a baseball-type projection and FIG. 8 shows a soccer-type projection.

Turning now to FIGS. 1–3, the cleat system 20 is shown in a basic form having a shank 24 with a head 26 on a first end 28 thereof and a leading end 30 on a second end 32 thereof. The cleat system 20 also includes a nut 34 for engagement with the shank 24 to attach the cleat system 20 to a work piece. The nut 34 has a wall 40 which generally defines a bore 42 therein. The wall 40 defines an entry end 44 for receiving the leading end 30a of the shank 24. The wall 40 has axially disposed opposed edges 46, 48 defining a slot 50 therebetween. The slot 50 at least partially extends through the wall 40, and, in the preferred embodiment as shown, the slot 50 extends completely through the wall 40.

Displacement structure 52 is provided on the cleat system 20 to provide a mechanical advantage in translating rotary and axial forces into circumferential radial forces as will be described in greater detail hereinbelow. The displacement structure 52 as shown includes a nut tapered surface 58 on an interior surface 94 of the nut 34 and a shank tapered surface 54 positioned on an exterior surface 68 of the shank 24. Threads 60 are provided on the cleat system 20 for axially displacing and engaging the nut or shank 34, 24 for engaging and disengaging the displacement structure 52. Operation of the threads 60 deforms and releases the wall 40 of the nut 34 and displaces the opposed edges 46, 48 of the wall 40.

The general principles of the invention are that the shank and nut operate by using threads to engage displacement structures which causes generally radially outwardly deformation of the wall of the nut. As shown, the threads 60 include an external thread 62 formed on the leading end 30 of the shank 24 and an internal thread 64 formed on the interior surface 94 of the nut 34. The external and internal threads 62, 64 are engaged to bring the tapered surfaces 54, 58 into close position. Rotation or engagement of the shank 24 in the nut 34 results in engaging the tapered surfaces 54, 58 to produce a circumferential, generally radially outward expansion force on the nut 34.

The external diameter 72 of the shank 24 is substantially equal to the external diameter 98 of the nut 34 in a relaxed or unexpanded condition. In this manner, the nut 34 and bolt 22 are easily inserted into the apertures 90, 92 of one or more work pieces 37, 38 having a single diameter. However, engagement of the tapered surfaces 54, 58 will result in increasing the diameter 98 of the nut 34. The expansion mechanism of the displacement structures 52 generally outwardly radially expand the nut 34 to create circumferential expansion forces which frictionally engage an exterior surface 100 of the nut 34 with an interior surface 102 of the bore 92 in the work piece 38.

The threads 62, 64 are sized and dimensioned for engaging the bolt tapered surface 54 with the nut tapered surface 58 upon a 90° rotation of the shank 24 relative to the nut 34. This 90° rotation or "quarter turn" of the shank relative to the nut promote quick and easy engagement and disengagement of the cleat system 20 from the work pieces 37, 38. To further facilitate ease of engagement and disengagement, alignment structures 74 are provided on the nut 34 and the bore 104. The alignment structures as shown in FIGS. 1–3 include a key 76 positioned in the bore 104 for engagement with the slot 50. As shown in FIG. 2, the key 76 is sized and dimensioned to prevent interfering with the engagement of the tapered surfaces 54, 58. Further, the key 76 may be sized and dimensioned to prevent interfering with the operation of the external threads 62 with the internal threads 64. Alternatively, if desired, the key 76 may extend into the thread path to create a degree of interference with the threads 62.

In use, the cleat system 20 includes threading the nut 34 onto the shank 24 to a point before engagement of the displacement structures 52. The cleat system 20 is then inserted into the corresponding bore or bores 90, 92. While inserting the cleat system 20, the slot 50 is aligned with the key 76 to prevent rotation once the shank 24 is rotated relative to the nut 34. Rotation of the shank 24 in the nut 34 causes the tapered surfaces 54, 58 to engage. Continued rotation of the shank 24 and the nut 34 further operates the threads 60 producing circumferential outward radial forces between the exterior surface 100 of the nut 34 and the interior surface 102 of the bore 92.

Removal of the cleat system 20 from the bores 90, 92 is similarly quick and efficient. Rotation of the shank 24 to operate threads to disengage the displacement structure 52 relieves the forces from the nut 34. Disengagement of the tapered surfaces 54, 58 removes the stress placed on the wall 40 which created the frictional engagement between the exterior surface 100 and the interior 102. Once the circumferential outward radial forces have be en sufficiently released, the entire cleat assembly 20 may be axially withdrawn from the bores 90, 92.

Having now described the general structure and function of the cleat system 20, we return to specific examples of this system with different cleat projection configurations. Basically, the difference in the cleat configuration is the type of projection associated with the system. Additionally, as will be described in greater detail hereinbelow, various forms of receptacle may be used to attach the cleat assembly to the work piece such as a shoe.

With reference to FIG. 4, the cleat system includes a projection 110 in the form of a spike. Generally, the spike is an extension of the head 26. An annular groove 112 is provided in close proximity to the projection 110 to retain a skirt or flange 113.

While the spike configuration of the projection 110 is well known, a "soft-spike" configuration of the ground engaging projection 114 is becoming more popular and is specifically shown in FIGS. 5 and 6. The "soft-spike" projection 114 provides a resilient material which is molded over the head 26 of the shank 24. As shown in FIG. 6, a flange 116 is provided on the head 26. The flange provides a structure to mold over and around to provide secure attachment of the "soft-spike" projection 114 to the shank 24. The benefits of the "soft-spike" projection 114 are that they tend to produce less wear on the golf course turf surfaces as well as on the club house and other facilities. The "soft-spike" projection 114 provides secure traction, yet tends to not puncture the turf surface.

Turning to FIG. 7, a projection in the form of a tooth 120 is provided. This type of projection tooth 120 is commonly used on athletic footwear worn to play baseball. In this configuration, the head 26 overlies a base portion 122 of the tooth 120. The nut 34 projects through an opening 124 in the base 122 and extends into the bore 104. As shown in the other configurations, the bore 104 includes a key 76 which engages the slot 50 of the nut 34. The shank 24 is turned a quarter turn to expand the nut 34 in both the opening 124 and the bore 104 thereby securely retaining the tooth, 120 with its extending traction element 128 against the shoe sole 37.

FIG. 8 shows a soccer-type cleat. The soccer-type cleat is similar to the cleat as shown in FIGS. 5 and 6 such that the projection 130 is molded over a flange 116. A receptacle 132 is provided with the system as shown in FIG. 8. The receptacle 132 includes a threaded portion 134 which is engaged with the sole of the shoe 37. The key 76 is carried on an internal surface of the receptacle 132 for alignment and engagement with the slot 50. The receptacle 132 is threaded into the sole 37 and is intended to be left in the sole 37. The shank 24, projection 130 and nut 34, however, are intended to be inserted and removed from the receptacle 132 as necessary. It should be noted that with regard to all of the projections 110, 114, 120 and 130 that wear and damage may occur necessitating replacement. The cleat system 20 of the present invention provides for quick, efficient and reliable attachment to and removal from the sole 37.

Turning to FIG. 9, an alternate embodiment of the alignment structure 74a is shown. As shown in the previous figures, the alignment structure 74 includes the key 76 which is engagable with the slot 50. In FIG. 9, the key 76a is disposed on the exterior surface 100 of the nut 34a. A bore 140 in the sole 37 includes a channel 142 therein. The channel 142 is sized and dimensioned to receive the key 76a. In this manner, the alignment structure 74a provides the same rotation preventing function as the alignment structure 74 shown in the preceding figures.

FIG. 10 shows the cleat system in which the hardware including the shank 24 and nut 34 are captive on the projection 120. The head 26 of the shank 24 has an extending portion 144 having a greater dimension 146 than a corresponding diameter 148 of the opening 124 and the shank 24. As such, the extension portion 144 prevents the shank 24 from completely moving through the opening 124. The leading end 30a includes a retainer 146 which has a dimension 149 which is greater than a diameter 150 of the threaded portion 152 of the shank 24a. While some axial displacement is possible (see dimension 154), the projection 120 is retained between the extension portion 144 and the nut 34. The nut 34 is prevented from removal by the retainer 146.

Also important to note in FIG. 10 is that displacement structure 52a is provided which is slightly different from that as shown in the preceding figures. As shown in FIG. 10, the displacement structure 52a includes a shank tapered surface 58a but no nut tapered surface is provided. In this embodiment, the shank tapered surface 58a works against an edge 156 of the nut 34. As such, in this embodiment, the displacement structure 52a includes only one tapered surface, the shank tapered surface 58a.

As shown in FIG. 11, the nut 34b is provided in a form having a non-circular cross-section. With reference to the preceding figures, each of the nuts 34 shown therein define a generally cylindrical form having a generally circular cross-section. However, a nut having a non-circular cross-section is advantageous. The non-circular cross-section nut 34b prevents rotation of the nut 34b in the corresponding bore 140b. As shown in FIG. 11, the nut 34b has a generally triangular cross-section. The three spaced apart lobes of the triangular nut 34b are positionable in corresponding opposed flutes within the bore 140b. A slot 50b extends through a wall 40b of the nut 34b. The nut 34b is expandable in accordance with the teachings as provided hereinabove. Similar to the embodiment as shown in FIG. 10, the nut 34b does not include a nut tapered surface and therefore it is the shank tapered surface 58 which drives against the edge 156b to expand the nut 34b within the bore 140b.

Based on the foregoing teachings, it may be evident that nuts having other cross-sectional shapes may be utilized. For example, a square, pentagonal, hexagonal or even a TORX® shaped hexlobular shape may be used. In any one of these non-circular nut configurations, the need for a key 76 in the bore is less important and may be eliminated. It should be noted that the embodiment as shown in FIG. 9 including the key 76a positioned on the external surface 100 of the nut 34 also, by definition, has a non-circular cross-section and as such would also be included in this category of nut. As evident from the illustration and description of FIG. 9, a corresponding channel 142 or other feature must be provided in the bore 140 to accommodate the corresponding key or other feature to prevent rotation of the nut.

FIG. 12 provides an illustration of the receptacle 132a which is sized and dimensioned for use with the non-circular nut 34b of FIG. 11. However, it should be appreciated based on the teachings herein that this receptacle 132a can be modified to accommodate the particular shapes of any one of the nuts shown in the illustrations and as described herein. The receptacle 132a is designed for molding into a shoe sole to provide an added degree of retention. The receptacle 132a includes a rim 160 having depending mounting flanges 162 extending therefrom. The receptacle 132a is molded into the shoe sole generally in an orientation to position an upper edge 164 of the rim 160 flush with the surface of the shoe sole. As such, the mounting flanges 162 will be embedded in or beneath the surface of the shoe sole providing additional engagement therewith. As an additional consideration, holes 166 are provided in the mounting flanges 162 to provide further engagement with the shoe sole material once molded thereover whereby the shoe sole material will be forced through the hole 166 providing greater engagement between the material and the receptacle 132a.

The receptacle 132a is sized and dimensioned to receive the nut therein. When expanded, the outside surface of the nut will frictionally engage the inside surface of the receptacle rim 160. Because the receptacle 132a is of a generally rigid construction, compared to the generally flexible construction of a shoe sole, the receptacle 132a increases the frictional engagement between the nut and the receptacle 132a. In contrast, depending on the forces exerted by the expanded nut, a shoe sole that does not have a generally rigid receptacle 132a may deform around the nut resulting in disengagement of the nut from the shoe sole. In other words, because the shoe sole is generally flexible and the nut is generally rigid, the shoe sole may deform around the nut allowing the nut and the attached cleat system to release from the shoe sole. As such, a receptacle as shown in FIG. 12 and described herein may be beneficial to provide increased security of attachment between the cleat system and the shoe sole.

While a preferred embodiment of the present invention is shown and described, it is envisioned that those skilled in the art may devise various modifications and equivalents without departing from the spirit and scope of the invention as defined by the appended claims. The invention is not intended to be limited by the foregoing disclosure.

The invention claimed is:

1. A cleat system comprising:
   a shank with a head on a first end thereof and a leading end on a second end thereof;
   an expandable nut for engagement with said shank to attach said cleat system to at least one work piece;
   a ground engaging projection retained on said cleat system relative to said work piece for extending away from said work piece;
   displacement structure being disposed on at least one of said shank and said nut for providing a mechanical advantage in translating rotary and axial forces into generally radial forces to expand said expandable nut; and threads on at least one of said shank and said nut to selectively engage and disengage said displacement structure, expanding of said nut providing engagement with an interior surface of a bore in said work piece in which said nut is positioned for retaining said cleat system on said work piece.

2. A cleat system as recited in claim 1, said nut further comprising:

a wall generally defining a bore therein, said wall having an entry end for receiving said leading end of said shank, and said wall having axially disposed opposed edges defining a slot at least partially extending therethrough whereby, threaded engagement of said shank and said nut engaging and disengaging said displacement structure for deforming and releasing said wall of said nut and displacing said opposed edges of said wall.

3. A cleat system as recited in claim 1, further comprising:

alignment structure on at least one of said work piece and said nut preventing rotation of said nut relative to said work piece upon rotation of said shank.

4. A cleat system as recited in claim 3, said alignment structure further comprising:

a key positioned in said bore of said work piece for engagement with said slot in said nut, said key and said slot being generally axially alignable and engagable for preventing rotation of said nut relative to said bore upon rotation of said shank in said nut.

5. A cleat system as recited in claim 3, said alignment structure further comprising:

a key on an external surface of said nut and said bore in said work piece having a generally corresponding channel for receiving said key, said key and said channel being generally axially alignable and engagable for preventing rotation of said nut relative to said bore upon rotation of said shank in said nut.

6. A cleat system as recited in claim 1, further comprising:

said threads including external threads on said leading end of said shank and internal threads on an interior surface of said wall of said nut.

7. A cleat system as recited in claim 1, said displacement structure further comprising:

a shank tapered surface on said shank between said head and said leading end, said shank tapered surface tapering inwardly towards said external threads, and a nut tapered surface on at least said entry end of said wall of said nut, said nut tapered surface tapering outwardly from said interior surface of said wall towards said entry end; and whereby rotation of said shank in said nut transferring forces to said shank tapered surface and said nut tapered surface for generally outwardly radially expanding said wall of said nut.

8. A cleat system as recited in claim 1, said threads and said displacement structure being dimensioned to engage said shank and said nut for expanding said nut to retain said cleat system on said work piece upon rotation of said shank approximately 90° relative to said nut.

9. A cleat system as recited in claim 1, further comprising: said projection being a spike extending from said head of said shank.

10. A cleat system as recited in claim 1, comprising:

a flange generally radially extending from said head of said shrink, said projection overlying and attached to said flange.

11. A cleat system as recited in claim 1, further comprising:

said projection being a tooth having a passage through which said shank and said nut extend for attaching said tooth to said work piece.

12. A cleat system as recited in claim 11, further comprising:

said passage in said tooth having a diameter which is less than a diameter of said nut, an extension portion on said head having a dimension which is greater than said diameter of said passage, said tooth being retained between said extension portion of said head and said nut.

13. A cleat system as recited in claim 12, further comprising:

a retainer on said leading end of said shank having a dimension which is greater than a diameter of said bore of said nut, said retainer preventing disengagement of said nut from said shank.

14. A cleat system as recited in claim 1, wherein said wall of said nut defines a generally cylindrical shape having a generally circular cross section.

15. A cleat system as recited in claim 14, further comprising:

a receptacle structure attachable to said work piece and defining a corresponding circular bore in said work piece for receiving said nut therein; and alignment structure on at least one of said receptacle structure and said nut preventing rotation of said nut relative to said receptacle structure upon rotation of said shank in said nut.

16. A cleat system as recited in claim 15, wherein said receptacle structure has threads on an external surface thereof for threaded engagement with said work piece.

17. A cleat system as recited in claim 1, wherein said wall of said nut defines a generally cylindrical shape having a generally non-circular cross section.

18. A cleat system as recited in claim 17, wherein said generally non-circular cross section of said nut is generally polygonal.

19. A cleat system as recited in claim 17, further comprising a receptacle structure attachable to said work piece and defining a corresponding non-circular cavity in said work piece for receiving said nut therein, said non-circular nut positioned in said non-circular cavity preventing rotation of said nut relative to said cavity upon rotation of said shank in said nut.

20. A cleat system comprising:

a shank with a head on one end thereof and a threaded leading end generally opposite said head;

an expandable nut engaged with said threaded leading end to attach said cleat system to at least one work piece;

a soft spike ground engaging structure being attached to said head of said shank;

displacement structure being disposed on at least one of said shank and said nut for providing a mechanical advantage in translating rotary and axial forces into generally radial forces; and said threads on said leading end of said shank engaging said nut to selectively engage and disengage said displacement structure, expanding of said nut providing engagement with an interior surface of a bore in a work piece in which said nut is positioned for retaining said soft spike ground engaging structure relative to said work piece.

* * * * *